J. T. COX.
FOOD FAT AND PROCESS OF FINISHING THE SAME.
APPLICATION FILED NOV. 26, 1919.
1,380,777.
Patented June 7, 1921.
2 SHEETS—SHEET 1.
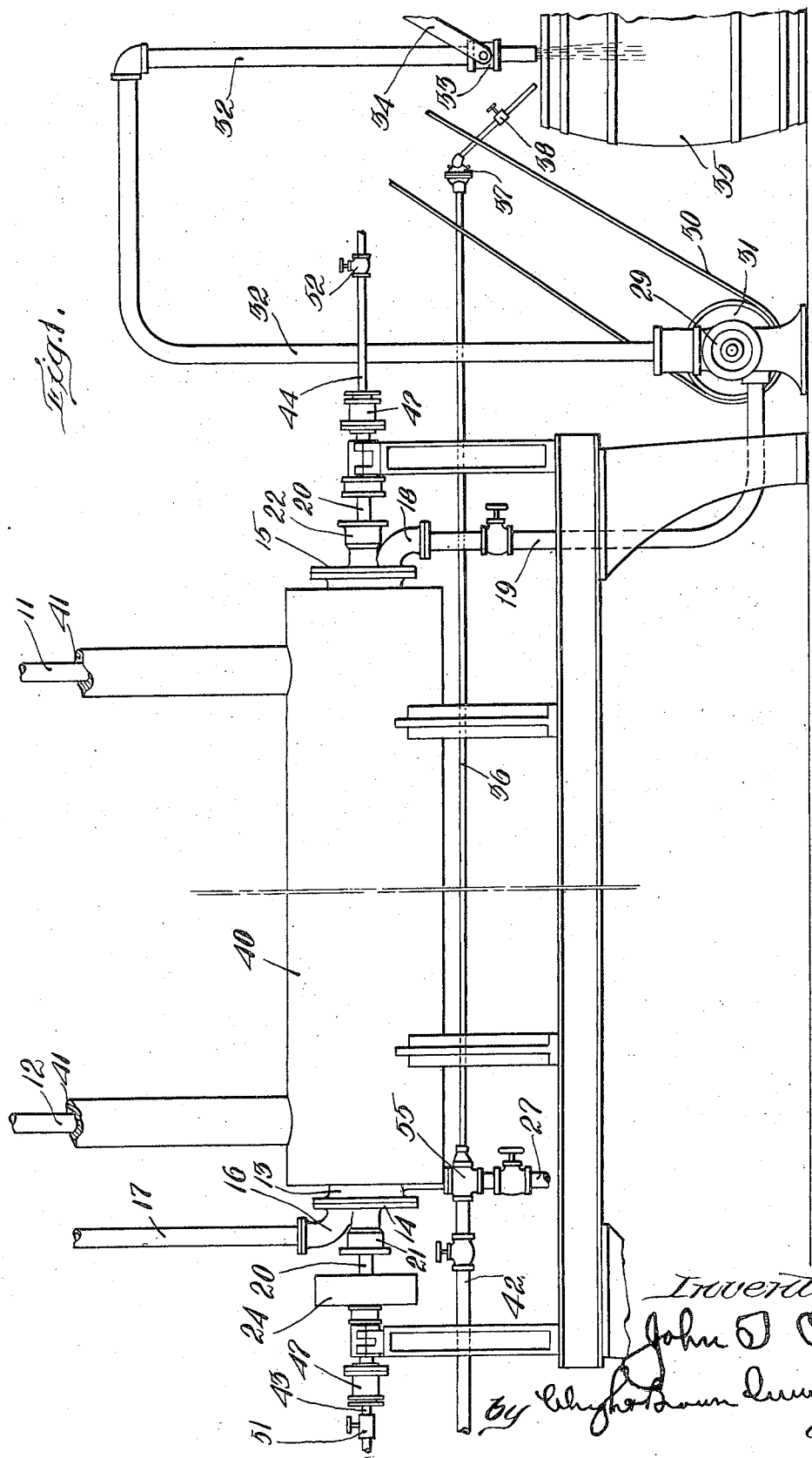

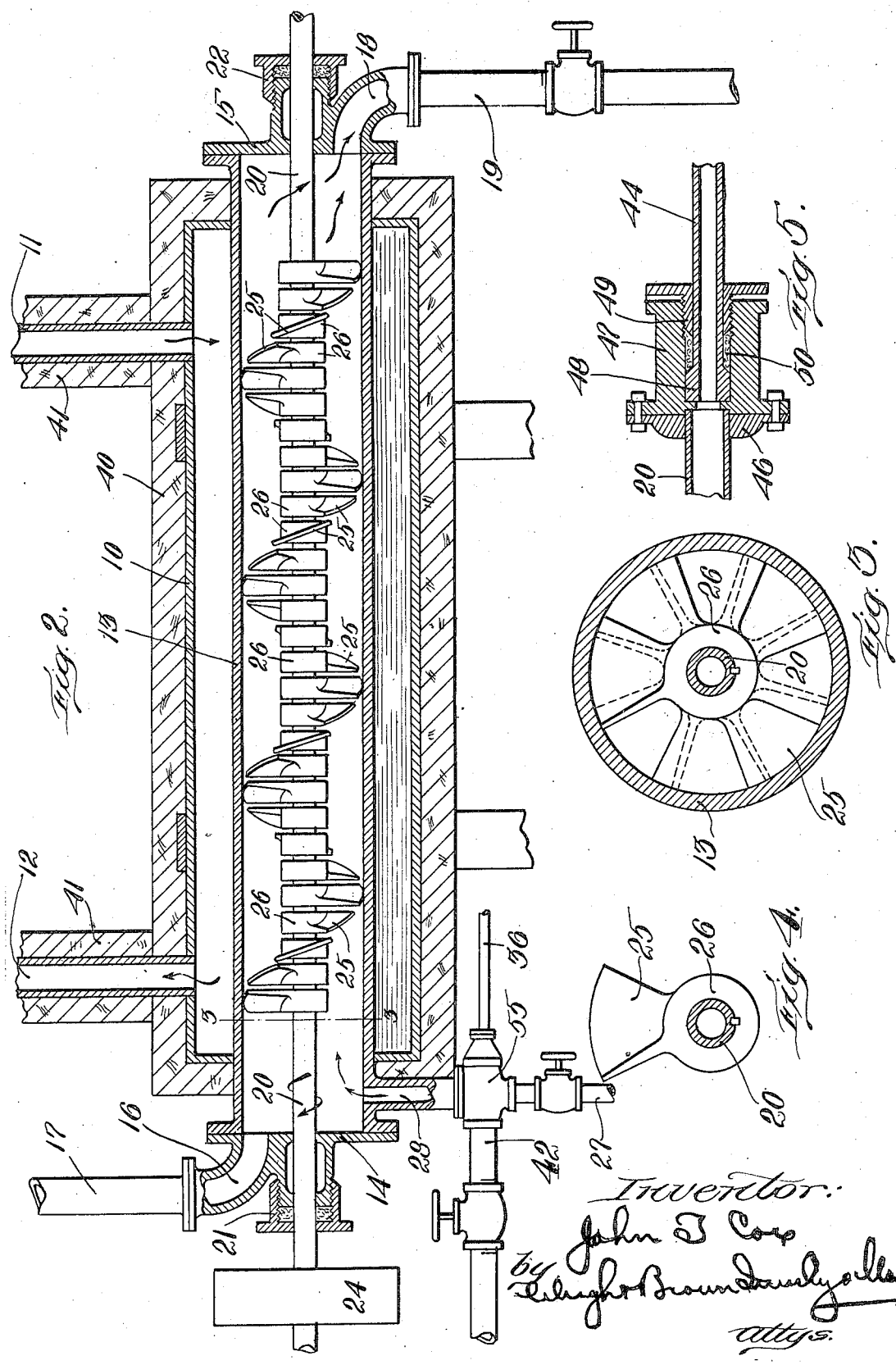

UNITED STATES PATENT OFFICE.

JOHN T. COX, OF BERLIN, NEW HAMPSHIRE, ASSIGNOR TO BROWN COMPANY, OF BERLIN, NEW HAMPSHIRE, A CORPORATION OF MAINE.

FOOD FAT AND PROCESS OF FINISHING THE SAME.

1,380,777.  Specification of Letters Patent.  Patented June 7, 1921.

Application filed November 26, 1919. Serial No. 340,702.

*To all whom it may concern:*

Be it known that I, JOHN T. Cox, a citizen of the United States residing at Berlin, in the county of Coos and State of New Hampshire, have invented new and useful Improvements in Food Fats and Processes of Finishing the Same, of which the following is a specification.

This invention has relation to culinary food fats having a consistency of that of lard or butter, and has for its object the production of a semi-solid vesiculated fat which is resistant to rancidity.

In the production of such fats, especially those for use in cooking, it has long been customary to subject them, while in a liquid heated condition to the action of a refrigerated roll to chill them in thin layers to insure a homogeneous product in which the solid glycerids are distributed uniformly throughout the mass, and then to subject the fat to a picking operation in which air is incorporated in the mass for imparting smoothness and a certain degree of stiffness thereto, and giving it the white appearance to which the housewife is accustomed. I have found in finishing fats of a good grade, particularly vegetable fats by the customary method thus described, that in the final "setting" after delivery from the picker, the fat is of a relatively hard and stiff character, especially in cold weather, so that it is with comparative difficulty incorporated with flour or sugar in the usual domestic culinary operations. If, however, the fat can be delivered to the cook in a soft and creamy condition, without being liquid, so that it can be readily worked into the flour or "creamed" with sugar, a smaller quantity of such fat can be used, thereby effecting a material saving, and a better product (*i. e.* bread, pastry, cake, confection or the like) results.

I have found that these optimum characteristics can be obtained by prolonging the picking operation, assuming the fat has the desired melting point, so as to incorporate therein a relatively large proportion of a non-toxic gas. This heretofore has not been feasible for the reason that the incorporation and distribution of air throughout the mass greatly increases the tendency of the fat to become rancid, as is well known, especially as the incorporation of the air is attended by the incorporation of the moisture which is entrained therewith.

In accordance with the present invention, I incorporate in the fat a large proportion, say about 4% to 10% by weight, of a non-toxic inert non-inflammable gas and exclude air and moisture therefrom, thereby providing a product which on setting is white, smooth and creamy so that it can be spooned from its receptacle and easily incorporated with powdery materials such as flour or sugar, even where such operation is carried on at a low temperature. Preferably the vesiculation is carried on under pressure, in a closed vessel, in which the chilling or refrigeration of the liquid fat and the incorporation of the gas are accomplished simultaneously, thereby effectively preventing the access of air and moisture.

In the accompanying drawing,—

Figure 1 illustrates an apparatus which may be employed in the process of producing the fat product.

Fig. 2 represents a longitudinal section through the refrigerating and picking instrumentality.

Fig. 3 represents a cross section on the line 3—3 of Fig. 2 on a larger scale.

Fig. 4 illustrates one of the picker blades.

Fig. 5 represents a longitudinal section through the coupling connecting a pipe with the hollow picker shaft.

The lard, lard substitute or other semi-solid fat is provided in the usual way. The solid fats and oil are heated and blended, or the oil is hydrogenized to the desired extent, as indicated by its melting point or iodin value, and the product is refined or deodorized in accordance with modern practice. Such refining or deodorizing, however, may be omitted in the case of high grade lard. In any event, however, the fat, which is semi-solid when cold, is heated to a temperature above its melting point, so that it is in a liquid state, and brought to a temperature of about 115° to 120° F. more or less before it is subjected to the action of the instrumentality which I shall now describe.

This apparatus comprises a cylinder 10, as shown in Fig. 2, with which are connected inlet and outlet pipes 11, 12, for the refrigerating medium which is utilized for chilling the fat. For this purpose, brine may be employed and it may be delivered to the cylinder 10 at a temperature of approximately zero degrees F. Extending through the cylinder 10, there is a concentric cylinder 13, the ends of which are closed by heads 14, 15. The head 14 is provided with an inlet duct 16 with which is connected the pipe 17 for conducting the liquid fat to the cylinder 13. The head 15 is provided with an eduction conduit 18 with which is connected the pipe 19 for conducting away the vesiculated and refrigerated fat. A shaft 20 is journaled in the interior cylinder 13 and it passes through stuffing boxes 21, 22, on the heads 14 and 15. This shaft is driven at the desired speed by a pulley 24 to which a belt extends from any suitable source of power. The shaft 20 is provided with a series of overlapping blades to form in effect a helix extending longitudinally of the shaft. These blades are indicated at 25 and each is provided with a hub 26 which may be keyed or otherwise secured upon the shaft. The outer edges of the blades are arcuate and concentric in respect of the axis of the shaft and are in contact with the wall of the cylinder 13. The function of the blades is to pick, churn or agitate the fat which is delivered to the cylinder 13, and to scrape the solidified films of fat from the internal surface of the cylinder. In addition, these blades force the fat longitudinally of the cylinder so as to effect a continuous flow of the fat therethrough. The blades constitute, as it were, an interrupted helical screw, so that, during each complete rotation of the shaft, the solidified fat is cut from the inner surface of the cylinder and is thrown inwardly and forwardly toward the exit or outlet passage. By centrifugal force the liquid fat is thrown again to the internal surface of the cylinder where it is solidified and then removed from the surface. Communicating with the feeding end of the cylinder, there is a pipe or conduit 27 which is coupled to the inlet port 28 so that nitrogen under pressure may be fed to the left end of the cylinder. The nitrogen is preferably under pressure of say 6 to 8 pounds, and it is used to sweep from the cylinder all of the air that may be therein contained before the fat is admitted to the cylinder. The nitrogen is dried in any suitable way to prevent the entrainment of moisture therewith. The liquid fat is pumped through the inlet pipe 17 into the gas-filled cylinder, and the picker shaft being in operation, the fat is simultaneously chilled, and churned or agitated, and the nitrogen is so put into the fat that preferably the finished fat contains from 4% to 10% by volume of nitrogen distributed throughout in minute bubbles or vesicles. The passage of the fat through the cylinder is regulated by the pumps by which the fat is delivered to the cylinder and from which it is removed.

In Fig. 1 it will be observed that the pipe 19 is connected to a rotary pump indicated as a whole at 29 and which is operated by a belt 30 and pulley 31. From the pump, a pipe 32 leads to a convenient point for delivering the fat to the containers. As shown, the pipe is provided with a valved nozzle 33, the valve handle being indicated at 34. Previous to the delivery of the finished fat to a container or receptacle such as indicated at 35, the latter may be swept clean of its air by the use of nitrogen. For this purpose, a small pipe 36 is coupled to the pipe 27 and is provided with a swiveled nozzle 37 provided with a valve 38, and which may be depressed so as to discharge the nitrogen into the container.

The cylinder 10 for containing the refrigerant, and the inlet and outlet pipes 11 and 12 for the refrigerant, are preferably insulated by jackets or coverings of cork or other suitable non-conducting material as indicated at 40, 41.

It is desirable that means should be provided for cleaning the refrigerating cylinder and the picker blades therein contained. To this end, the shaft 20 is hollow, and is connected to valved pipes 43, 44, by which steam or hot water may be admitted to and conducted away from the hollow shaft for the purpose of melting the fat on the shaft and blades so that it may all be forced from the cylinder or vessel. The hollow shaft may be connected with these pipes by any suitable form of coupling, such for example as indicated in Fig. 5, in which the shaft 20 is shown as having secured thereto a collar 46 to which is bolted a sleeve 47 which is threaded as shown. The pipe 44, for example, which is non-rotary, is provided with an enlarged end 48 between which and the end of a screw 49 there is interposed packing as at 50. When the apparatus is in use, the valves 51, 52 are closed. After the operation is completed and it is desired to clean the parts, the valves 51 and 52 are opened and steam or hot water is forced into the hollow pipe so as to melt and permit the removal of any solidified or partially solidified fat.

For the purpose of washing the refrigerating vessel, a valved pipe 42 is connected to the fitting 55, so that hot water or steam may be delivered into the vessel and conducted therefrom through the conduits 18, 19. This is not ordinarily done, except when the apparatus has been shut down for a considerable time. For removing moisture from the vessel after it has been washed, hot air may be forced through it by means of the pipe 42.

From the foregoing description, it will be apparent that the liquid fat, on being delivered to the cylinder, will be simultaneously agitated, whipped and chilled so that the particles of solid fat are uniformly distributed throughout the entire mass, which contains in addition unsaturated glycerids. The nitrogen at the same time is incorporated in the mass so as to produce a very smooth creamy white semi-solid when it is permitted to set after having been delivered to the container. Preferably the fat is delivered at a temperature of approximately 45° F., and, as stated, contains approximately 4% to 10% by volume of nitrogen or other non-toxic inert gas.

The proportion of gas in the fat may be closely regulated by varying the supply of the gas and of the fat, and the delivery of the fat from the refrigerating cylinder or vessel.

While I may employ any inert, non-toxic and non-inflammable gas, I prefer to employ nitrogen for incorporation in the fat.

Having thus explained the nature of my said invention and described a way of making and using the same, although without attempting to set forth all of the forms in which it may be made, what I claim is:

1. The process of treating edible fat, which consists in continuously chilling and solidifying successive portions of a body of liquid fat, and simultaneously incorporating said solidified portions in the body of the fat until the mass is converted into a semi-solid.

2. The process of treating edible fat, which consists in continuously chilling and solidifying successive portions of a body of liquid fat, and simultaneously incorporating such solidified portions and an inert non-toxic gas in the body of the fat until the mass is converted into a semi-solid.

3. The herein described method of treating fat, which consists in solidifying successive portions of the liquid fat in films, incorporating such films in the body of the liquid fat, and repeating such operations until said fat is in a semi-solid condition.

4. The herein described method of treating fat, which consists in solidifying successive portions of the liquid fat in films, incorporating such films in the body of the liquid fat, repeating such operations until said fat is in a semi-solid condition, and simultaneously therewith incorporating an inert non-toxic gas in the body of said fat.

5. The herein described method of treating edible fat which consists in refrigerating and agitating such fat, and simultaneously incorporating therein an inert non-toxic gas under pressure above atmospheric.

6. The herein described method of treating an edible fat which is semi-solid at ordinary temperatures, which consists in simultaneously refrigerating and agitating such fat, when in a liquid state, in a closed stationary vessel.

7. The herein described method of treating a liquid edible fat which consists in confining such fat in an atmosphere of an oxygen-free non-toxic gas, refrigerating successive films of such fat and simultaneously mixing such films and said gas with the body of said fat until a vesiculated mass, which is semi-solid at ordinary temperatures, is produced.

8. The herein described method of treating a liquid edible fat, which is semi-solid at atmospheric temperatures, which consists in feeding such liquid fat through a closed vessel, refrigerating such vessel, supplying an atmosphere of a non-toxic gas containing no free oxygen to said vessel, and agitating the fat in such vessel to scrape the films of solidified fat from the walls thereof and to incorporate in the body of the fat such films and such gas, and thereby produce a semi-solid of creamy texture.

9. The herein described method of treating a liquid edible fat, which is semi-solid at atmospheric temperatures, which consists in feeding such liquid fat through a closed vessel, refrigerating such vessel, supplying nitrogen to such vessel under pressure, agitating or picking such fat, scraping the films of solidified fat from the interior surface of such vessel, and incorporating such films and nitrogen in the body of said fat, thereby converting such fat into a semi-solid of creamy texture.

10. The herein described process, which consists in refrigerating and picking a melted fat in a closed vessel and incorporating therein a predetermined proportion of a non-toxic gas containing no free oxygen, to produce a vesiculated semi-solid mass.

In testimony whereof I have affixed my signature.

JOHN T. COX.